(12) United States Patent
Ragan et al.

(10) Patent No.: US 10,807,803 B2
(45) Date of Patent: Oct. 20, 2020

(54) HYGIENIC LOW-FRICTION MAGNETIC TRAY AND CONVEYOR

(71) Applicant: Laitram, L.L.C., Harahan, LA (US)

(72) Inventors: Bryant G. Ragan, Metairie, LA (US); Wayne A. Pertuit, Jr., Westwego, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/751,998

(22) Filed: Jan. 24, 2020

(65) Prior Publication Data

US 2020/0156875 A1 May 21, 2020

Related U.S. Application Data

(63) Continuation-in-part of application No. 15/884,556, filed on Jan. 31, 2018, now Pat. No. 10,654,660.

(51) Int. Cl.
*B65G 45/10* (2006.01)
*B65G 54/02* (2006.01)
*B65G 35/06* (2006.01)
*B65G 13/11* (2006.01)
*B65G 39/02* (2006.01)

(52) U.S. Cl.
CPC ............. *B65G 35/06* (2013.01); *B65G 13/11* (2013.01); *B65G 39/025* (2013.01); *B65G 54/02* (2013.01); *B65G 2207/26* (2013.01)

(58) Field of Classification Search
CPC ...... B65G 13/11; B65G 35/06; B65G 39/025; B65G 45/10; B65G 54/02
USPC .................. 198/494, 619; 104/281, 283, 286
See application file for complete search history.

(56) References Cited

U.S. PATENT DOCUMENTS

| 4,231,689 | A | | 11/1980 | Carstens |
| 4,595,870 | A | | 6/1986 | Chitavat |
| 4,742,778 | A | | 5/1988 | Morishita et al. |
| 4,802,761 | A | | 2/1989 | Bowen et al. |
| 5,126,648 | A | * | 6/1992 | Jacobs ................. B23Q 1/621 318/135 |
| 5,251,741 | A | | 10/1993 | Morishita et al. |

(Continued)

FOREIGN PATENT DOCUMENTS

| GB | 2133757 B | 1/1987 |
| JP | 05-077921 A | 3/1993 |

(Continued)

OTHER PUBLICATIONS

US 2005/0095087 A1, Sullivan et al., May 5 (Year: 2005).*

(Continued)

*Primary Examiner* — Douglas A Hess
(74) *Attorney, Agent, or Firm* — James T. Cronvich

(57) ABSTRACT

A hygienic magnetic tray and conveyor. The low-profile tray includes a forcer sandwiched between an article-supporting top and an opposite bottom. The top is made of hygienic material, and the bottom can be made of a low-friction material. The tray is propelled along a guide surface on an enclosure housing stator coils supported in a conveyor frame. The stator forms a linear motor with the forcer in the tray. Roller balls protruding from the bottom of one version of the tray provide low-friction rolling contact with the guide surface. Various disposal systems provide escape routes for removing fluids and debris from the guide surface of the stator enclosure.

13 Claims, 15 Drawing Sheets

(56) References Cited

U.S. PATENT DOCUMENTS

| | | | |
|---|---|---|---|
| 5,287,026 A | 2/1994 | Ogihara et al. | |
| 5,340,400 A * | 8/1994 | Schmidt | B23Q 1/4809 118/313 |
| 5,473,992 A | 12/1995 | Takei | |
| 5,881,649 A | 3/1999 | Hasegawa et al. | |
| 5,886,432 A | 3/1999 | Markle | |
| 5,906,262 A | 5/1999 | Miki | |
| 5,925,956 A | 7/1999 | Ohzeki | |
| 5,965,963 A | 10/1999 | Chitayat | |
| 6,045,319 A | 4/2000 | Uchida et al. | |
| 6,097,014 A | 8/2000 | Kirsch | |
| 6,250,230 B1 | 6/2001 | Post | |
| 6,274,952 B1 | 8/2001 | Chitayat | |
| 6,397,990 B1 | 6/2002 | Brien et al. | |
| 6,531,793 B1 | 3/2003 | Frissen et al. | |
| 6,568,332 B1 | 5/2003 | Hotzinger et al. | |
| 6,578,495 B1 | 6/2003 | Yitts et al. | |
| 6,580,185 B2 | 6/2003 | Kang et al. | |
| 6,684,794 B2 | 2/2004 | Fiske et al. | |
| 6,781,394 B1 * | 8/2004 | Boyle | G01R 31/01 324/750.13 |
| 6,917,136 B2 | 7/2005 | Thornton et al. | |
| 7,458,454 B2 | 12/2008 | Mendenhall | |
| 7,730,840 B2 | 6/2010 | Reichel et al. | |
| 7,812,482 B2 * | 10/2010 | Aso | H02K 41/031 310/15 |
| 7,948,122 B2 | 5/2011 | Compter et al. | |
| 8,136,453 B2 | 3/2012 | Hunter et al. | |
| 8,193,886 B2 | 6/2012 | Hahn et al. | |
| 8,359,981 B2 | 1/2013 | Hahn et al. | |
| 8,407,915 B2 | 4/2013 | George et al. | |
| 8,485,350 B2 | 7/2013 | Reinisch et al. | |
| 8,511,235 B2 * | 8/2013 | Fukukawa | B60L 13/03 104/292 |
| 8,528,486 B2 | 9/2013 | Lee | |
| 8,967,051 B2 | 3/2015 | King et al. | |
| 9,032,880 B2 | 5/2015 | King et al. | |
| 9,045,183 B2 | 6/2015 | Laurence et al. | |
| 9,202,719 B2 | 12/2015 | Lu et al. | |
| 9,260,210 B2 | 2/2016 | Jacobs et al. | |
| 9,346,371 B2 | 5/2016 | King et al. | |
| 9,394,114 B2 | 7/2016 | Hanisch et al. | |
| 9,446,902 B2 | 9/2016 | Aumann et al. | |
| 9,604,795 B2 | 3/2017 | Aumann et al. | |
| 9,611,107 B2 | 4/2017 | Wernersbach et al. | |
| 9,685,849 B2 | 6/2017 | Lu et al. | |
| 9,701,488 B2 | 7/2017 | Paweletz | |
| 9,906,110 B2 | 2/2018 | Sommerhalter, Jr. | |
| 9,950,524 B2 | 4/2018 | Shinkai et al. | |
| 9,988,165 B2 | 6/2018 | Jacobs et al. | |
| 10,112,777 B2 | 10/2018 | King et al. | |
| 10,227,182 B2 | 3/2019 | Burk et al. | |
| 10,654,660 B2 * | 5/2020 | Ragan | B65G 54/02 |
| 2003/0011093 A1 | 1/2003 | Cser | |
| 2015/0083018 A1 | 3/2015 | Clark et al. | |
| 2017/0050332 A1 | 2/2017 | Bauer et al. | |
| 2017/0331359 A1 | 11/2017 | Paweletz et al. | |
| 2017/0341255 A1 | 11/2017 | Burk et al. | |

FOREIGN PATENT DOCUMENTS

| | | |
|---|---|---|
| JP | 07-228346 A | 8/1995 |
| WO | 2004011351 A2 | 2/2004 |
| WO | 2009083889 A1 | 7/2009 |
| WO | 2010-092473 A1 | 8/2010 |
| WO | 20188067567 A1 | 4/2018 |

OTHER PUBLICATIONS

US 2016/0001978 A1, Ragan, Jan. 7 (Year: 2016).*
US 2016/0297626 A1, Jochim et al., Oct. 13 (Year: 2016).*
International Search Report and Written Opinion of the International Searching Authority, PCT/US2019/015331, dated May 15, 2019, Korean Intellectual Property Office, Republic of Korea.

* cited by examiner

HYGIENIC LOW-FRICTION MAGNETIC TRAY AND CONVEYOR

CROSS-REFERENCE TO RELATED APPLICATIONS

This application is a continuation-in-part of co-pending U.S. patent application Ser. No. 15/884,556, filed Jan. 31, 2018, the disclosure of which is incorporated by reference into this application.

BACKGROUND

The invention relates generally to power-driven conveyors and in particular to magnetically driven tray conveyors.

Conventional conveying systems using flat belts, modular plastic or metal belts, gravity rollers, or powered rollers have many components. The number of harborage points for pathogens and toxins increases with the number of components. Because motors, gearboxes, roller bearings, shafts, pulleys, and sprockets can all collect food particles and harbor pathogens, they must be cleaned regularly. In food applications all the components must comply with strict food-use standards.

Some tray conveyors use linear-motor stators with coils propagating an electromagnetic wave along the conveyor to drive magnetic article-transporting trays. The stators are mounted in housings along the carryway. The top tray-supporting surface of the stator housing is flat. The flat surface can collect liquids that harbor contaminants. And sliding friction between the flat tray-supporting surface and the bottom of the tray requires more energy to overcome the friction and wears the contacting surfaces.

SUMMARY

One version of a conveyor tray embodying features of the invention comprises a top including an article-conveying face, a bottom opposite the top, and a forcer disposed between the top and the bottom. Roller balls protrude from the bottom.

One version of a tray conveyor embodying features of the invention comprises a tray and a linear-motor stator propelling the tray along the conveyor. The tray has a top and a bottom opposite the top. A forcer is disposed between the top and the bottom. Rollers balls have salient portions that extend through holes in the bottom of the tray. The linear-motor stator is supported in a conveyor frame. A stator enclosure houses the stator. A top guide surface supported in the conveyor frame under the tray has a pair of parallel grooves that extend along the length of the top guide surface and are sized to receive the roller balls to retain the roller balls as the linear-motor stator propagates an electromagnetic wave along the length of the conveyor frame that interacts with the forcer to propel the tray along the top guide surface with the roller balls rolling in the grooves.

DETAILED DESCRIPTION OF THE DRAWINGS

DETAILED DESCRIPTION

Figure 1:
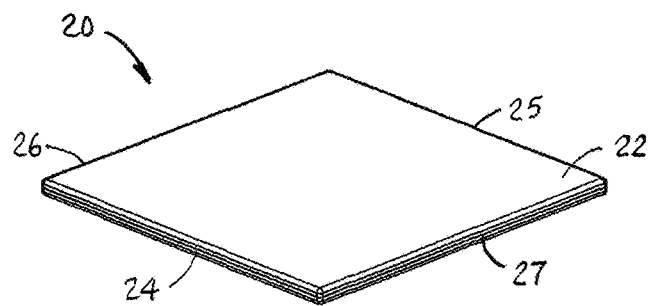
FIG. 1 is an isometric view of a tray conveyor embodying features of the invention.
Figure 2:
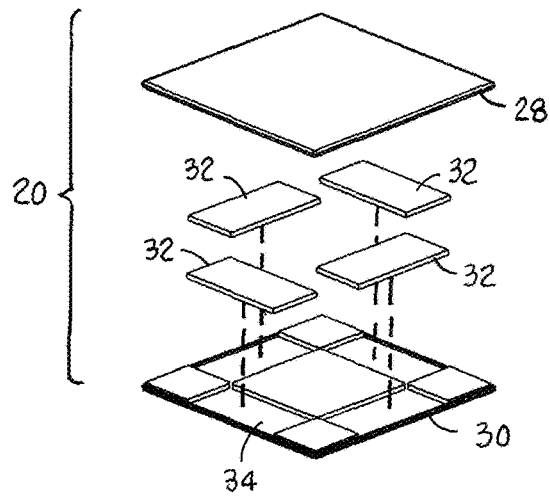
FIG. 2 is an exploded isometric view of the tray of FIG. 1.

A magnetic conveyor tray for a tray conveyor is shown in FIGS. 1 and 2. The tray 20 is a low-profile, four-sided disk, or plate, with a flat upper article-supporting face 22. The tray 20 extends in length from a first end 24 to a second end 25 and in width from a first side 26 to a second side 27. The length and width of the low-profile tray 20 are much greater than the tray's thickness top to bottom.

As shown in FIG. 2, the tray 20 is constructed of a top 28 and a bottom 30. Permanent-magnet arrays 32, sandwiched between the top 28 and the bottom 30, form a forcer. The bottom 30 has recesses 34 in which the magnet arrays 32 reside. Although the top 28 and the bottom 30 can be made of the same material, they can also be made of different materials. For example, the top 28 can be made of a hygienic material for contact with food articles, and the bottom 30 can be made of a low-friction material for low-friction sliding. The materials can be plastics or ceramics, for example. Examples of hygienic plastic materials for the top 28 are: polyethylene terephthalate (PET, or PETE), high-density polyethylene (HDPE), and polystyrene (PS). Examples of low-friction plastic materials for the bottom 30 are: polyoxymethylene (POM, acetal), polypropylene (PP), and ultra-high-molecular-weight polyethylene (UHMW). The magnet arrays 32 can be made of metal or ceramics, but can also be made of plastic magnet material as are refrigerator magnets, as a few examples.

The top 28 may be attached to the bottom 30 by injection co-molding the two pieces around the magnet arrays 32. Or the top 28 can be overmolded onto the bottom 30 and the magnet arrays 32. The top 28 and the bottom can alternatively be attached by adhesives, welds, or mechanical fasteners, including snap-on fasteners, as a few examples.

Figure 3:
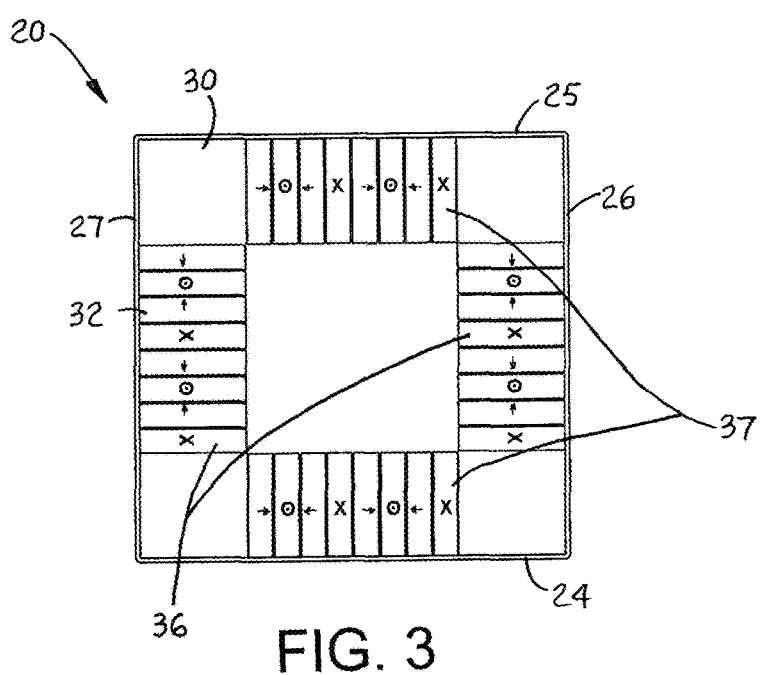
FIG. 3 is a bottom view of the tray of FIG. 1 showing Halbach magnet arrays.

FIG. 3 shows one arrangement of the magnet arrays 32 as forcers. The four magnet arrays 32 are arranged in pairs 36, 37 of parallel arrays. The first pair 36 extends in length along the first and second sides 26, 27 of the tray 20, and the second pair 37 extends in length along the first and second ends 24, 25. The first pair 36 of parallel magnet arrays 32 is orthogonal to the second pair 37. Each of the arrays 32 is shown as a Halbach array to increase the magnetic field directed downward normal to the bottom 30 of the tray 20. But the magnet arrays 32 could alternatively be magnetized with north and south poles alternating along their lengths. Or the magnet arrays can be arranged in a checkerboard pattern of permanent magnets N, S of alternating polarities as in FIG. 21. The rows and columns of the checkerboard pattern are oriented at 45° relative to the sides of the tray 186. The checkerboard array can be converted into a Halbach array by placing magnets whose polar axes lie in the plane of the array, rather than perpendicular to it, between adjacent magnets N, S on all sides. In any case the magnet arrays 32 can be magnetized after the top 28 and the bottom 30 are joined. Otherwise the magnet arrays 32 can be magnetized with their predetermined field pattern before construction of the tray 20. And, although the tray 20 is shown with four magnet arrays 32, the tray could alternatively be constructed with only one pair of magnet arrays, either the first pair 36 or the second pair 37, if the tray has to travel only either end first or side first. In some configurations, only a single magnet array 32 would suffice. Instead of magnet arrays, the forcer could be made of electrically conductive elements or of a linear array of soft iron forming poles.

Figure 4:
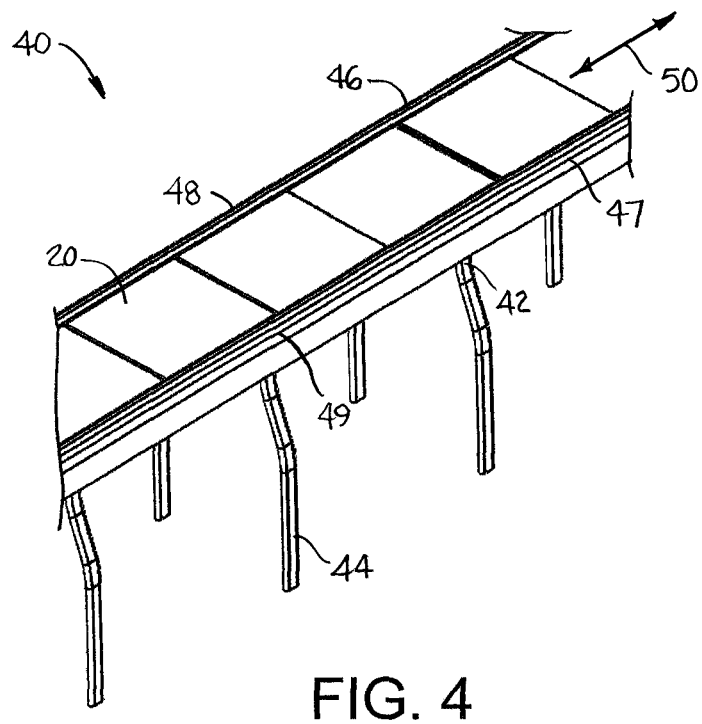
FIG. 4 is an isometric view of a portion of a tray conveyor using trays as in FIG. 1.
Figure 5:
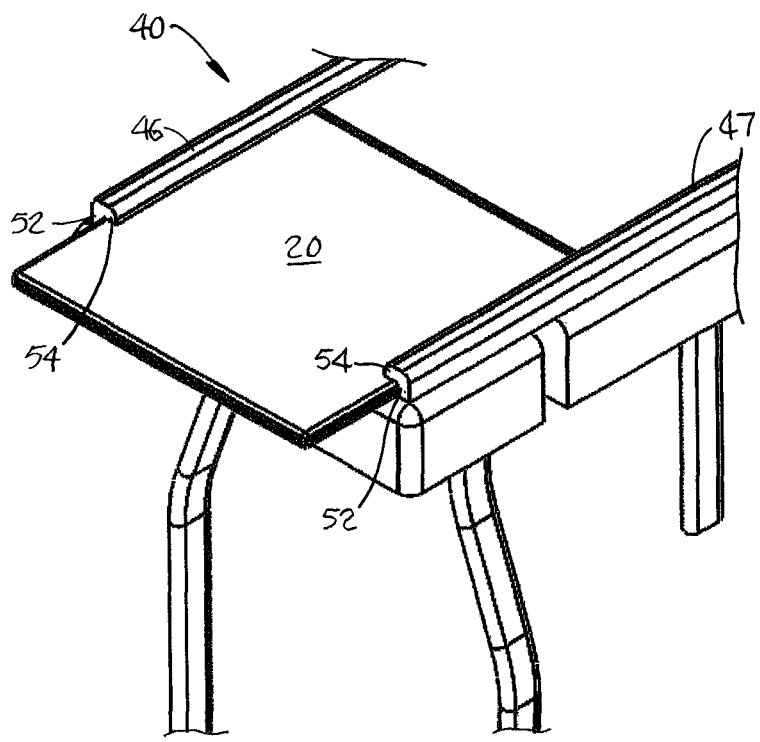
FIG. 5 is an enlarged view of a portion of the tray conveyor of FIG. 4.

A portion of a tray conveyor for the tray 20 of FIG. 1 is shown in FIG. 4. The conveyor 40 comprises a conveyor frame 42 having legs 44 and tray rails 46, 47 along first and second sides 48, 49 of the frame 42. The tray rails 46, 47 define a conveying path for the trays 20 in a bidirectional conveying direction 50. As shown in FIG. 5, the tray rails 46, 47, like angle brackets, are each in the shape of an inverted L with a vertical side wall 52 and a cantilevered overhang 54. The side walls 52 limit the lateral horizontal excursion, or drift, of the trays 20. The overhangs 54 limit the vertical excursion of the trays 20. In this way the low-profile trays 20 are confined to the conveying path.

Figure 6:
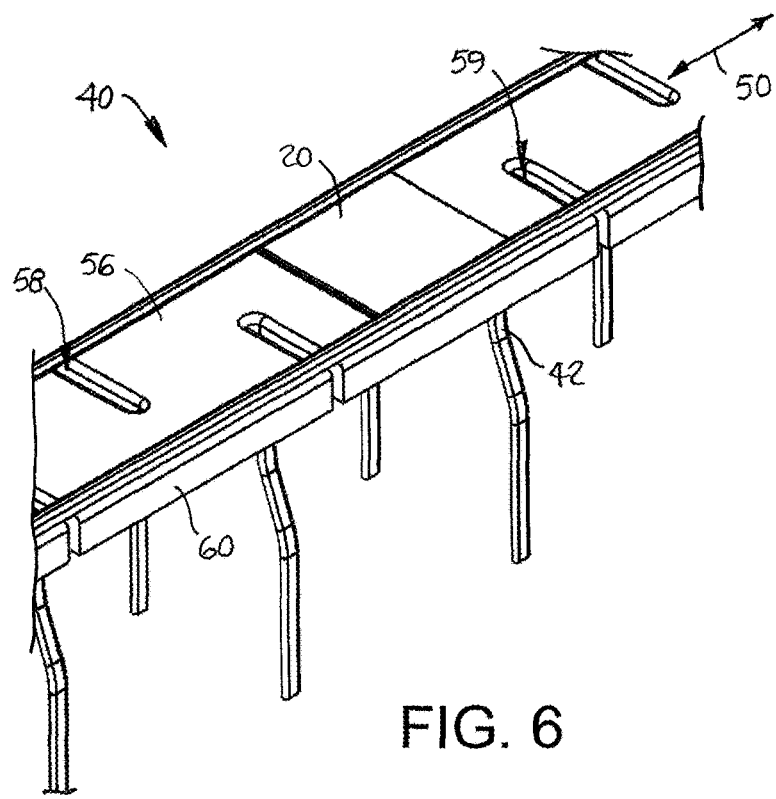
FIG. 6 is an isometric view of the tray conveyor of FIG. 4 with only a single tray.
Figure 7:
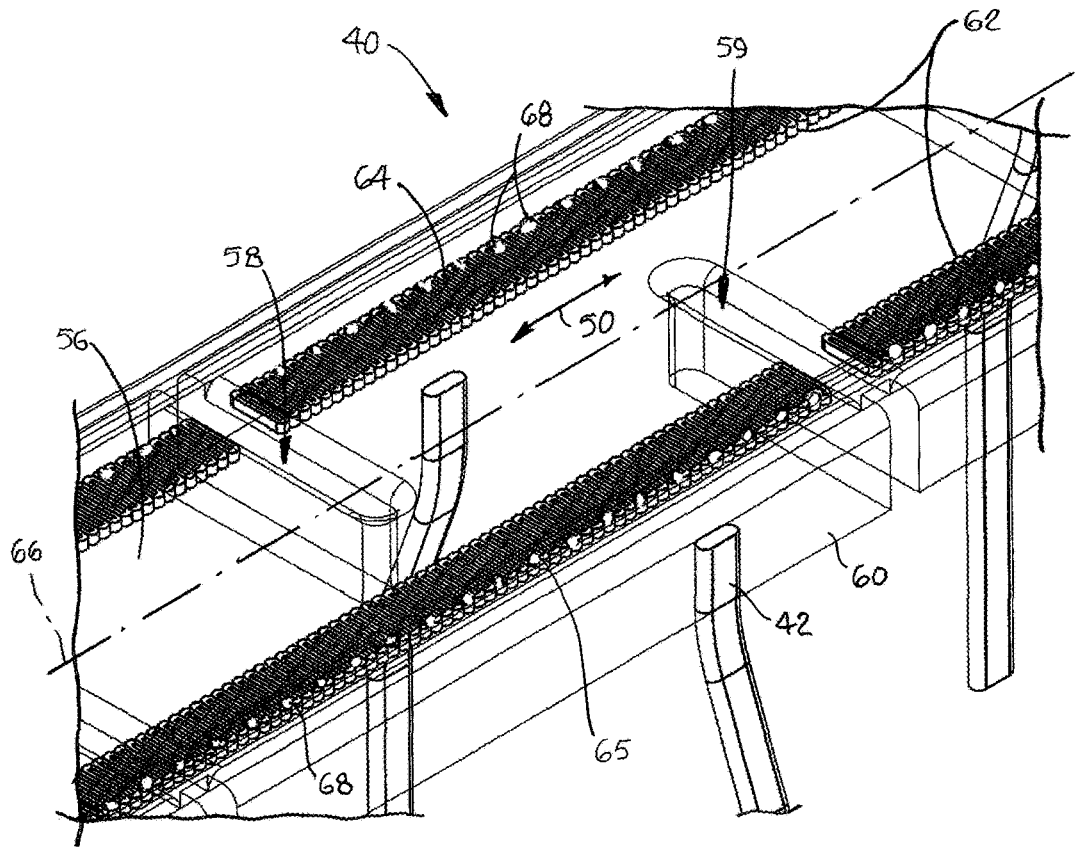
FIG. 7 is an isometric view of a portion of the tray conveyor of FIG. 4 with the stator housing in phantom and showing one version of drainage holes.

As shown in FIG. 6, the tray conveyor 40 has a top guide surface 56 supported in the conveyor frame 42 on or over which the trays 20 ride. The guide surface 56 can be a slide surface for trays 20 that ride along in sliding contact with the surface. If the trays are levitated, they ride slightly above the underlying guide surface 56 without contact. The guide surface 56 is smooth with through holes 58, 59 opening onto it. In this version the through holes 58, 59 are in the form of slots elongated in a lateral direction perpendicular to the conveying direction 50. As further shown in FIG. 7, the through holes 58, 59 extend all the way through the thickness of enclosures 60, each housing a linear-motor stator 62 that includes left and right stator coils 64, 65 forming a double stator. The left and right stator coils 64, 65 are interrupted by the elongated slots 58, 59. The left slots 58 alternate with the right slots 59 along the length of the conveyor 40. The slots 58, 59 extend laterally inward from the left and right sides 48, 49 of the conveyor frame 42 past the centerline 66 of the conveyor 40. The left and right slots 58, 59 overlap in the conveying direction 50. The slots 58, 59 form a disposal system that provides egress for fluids and debris from the guide surface 56. In this version and in all other versions of tray conveyors subsequently described, the top guide surface 56 can be integral with and form part of the stator enclosure, or it can be a separate component, such as a sheet, on or over which the trays ride above the stator. In either case the guide surface is disposed between the linear-motor stator 62 and the trays 20.

The left and right stators 64, 65 each propagate an electromagnetic flux wave in the conveying direction 50. The stators 64, 65 are conventionally driven by three-phase coil controllers (not shown). The stator 62 can be separated along the length of the conveyor 40 into a series of stator zones, each driven by an independent coil control to provide independent zone control of the trays 20. The left stator coils 64 are spaced apart laterally from the right stator coils 65 the same distance as the magnet arrays 32 of the first pair 36 in the tray 20 of FIG. 3. In that way the magnet arrays 36 in the tray 20 are aligned with and close to the left and right stators 64, 65 in the conveyor frame 42 for maximum magnetic coupling. And the left and right stator coils are spaced so as to advantageously interact with the pole pitch of the magnet arrays 32. The traveling electromagnetic flux wave generated by the stator 62 interacts with the magnetic fields of the tray's magnet arrays 32 to produce a repulsive force that propels the trays 20 along the top guide surface 56 in the conveying direction 50. Thus, the stators form a linear synchronous motor with the magnet arrays. If the forcer is instead made of electrically conductive elements, the stator forms a linear induction motor with the forcer. If the forcer is made of a linear array of soft iron forming poles, the stator forms a linear variable-reluctance motor with the forcer.

Position sensors 68 positioned periodically along the length of the conveyor 40 at spaced apart positions sense the presence of a tray at their positions as the tray passes by. The position sensors 68 can be, for example, Hall-effect devices that sense the magnetic field of the magnet arrays in the trays 20. The outputs of the position sensors are used to control the energization of the stator 62. Some examples of other position sensors are: (a) capacitive sensors sensing the change in the electric field caused by a passing tray; (b) optical sensors, such as photo eyes or light curtains; (c) cameras and visioning systems; (d) radar; (e) induced eddy-current sensors; (f) ultrasonic sensors; and (g) reed switches. The stator coils 64, 65 are wound around ironless cores to reduce friction between the tray 20 and the top guide surface 56 that would be caused by attraction to the tray's magnet arrays. If friction is not a problem, iron cores can be used.

Figure 8:
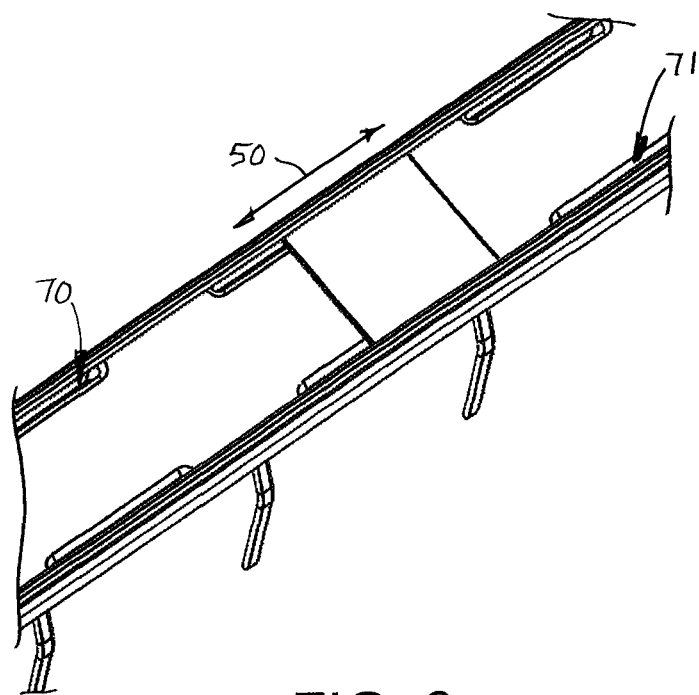
FIG. 8 is an isometric view of a portion of a conveyor as in FIG. 4 with another version of drainage holes.
Figure 9:
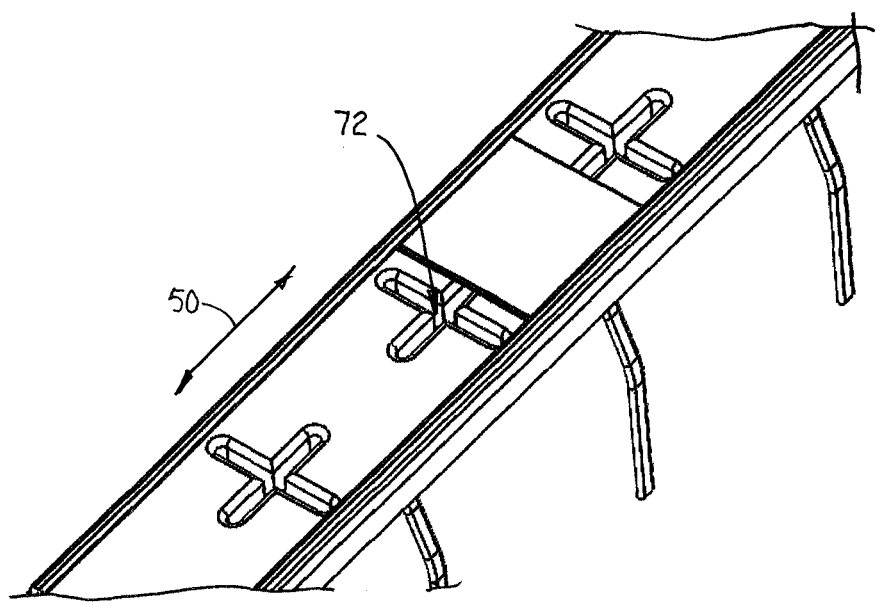
FIG. 9 is an isometric view of a portion of a tray conveyor as in FIG. 4 with yet another version of drainage holes.

As shown in FIGS. 8 and 9, alternative through-hole patterns can be used in the disposal system. In FIG. 8, for example, left and right through holes 70, 71 are slots elongated in the conveying direction 50 and positioned along the sides of the conveyor to serve as gutters. In this version the left and right elongated slots 70, 71 are aligned across the width of the conveyor, but they could be staggered. Through holes 72 in the conveyor of FIG. 9 are cruciform in shape with slotted arms elongated in the conveying direction 50 intersecting slotted arms elongated in the direction perpendicular to the conveying direction. Other hole shapes are possible. For example, round, elliptical, oval, or polygonal through holes could be used. Or the disposal system could include other discontinuities or breaks in the top guide surface 56 and the stator enclosures, such as gaps between consecutive linear-stator enclosures.

Figure 10A:
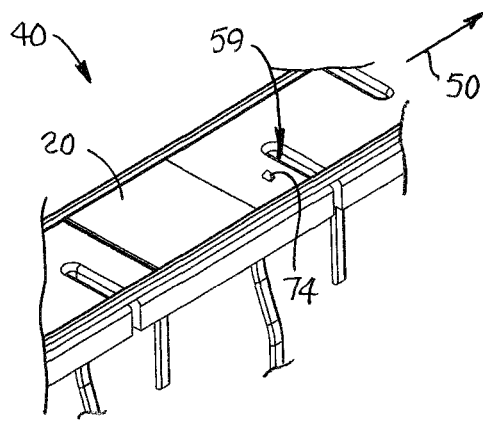
FIGS. 10A-10C are isometric views of a portion of a conveyor as in FIG. 6 showing a sequence of steps in which a tray sweeps debris from the conveyor.
Figure 10B:
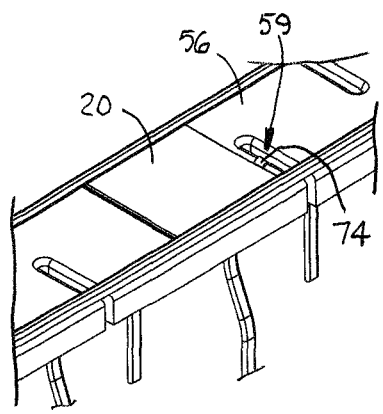
Figure 10C:
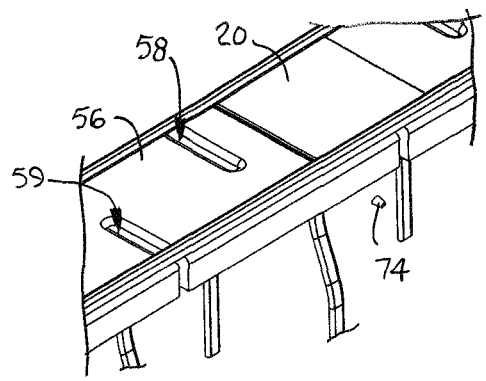
Figure 11:
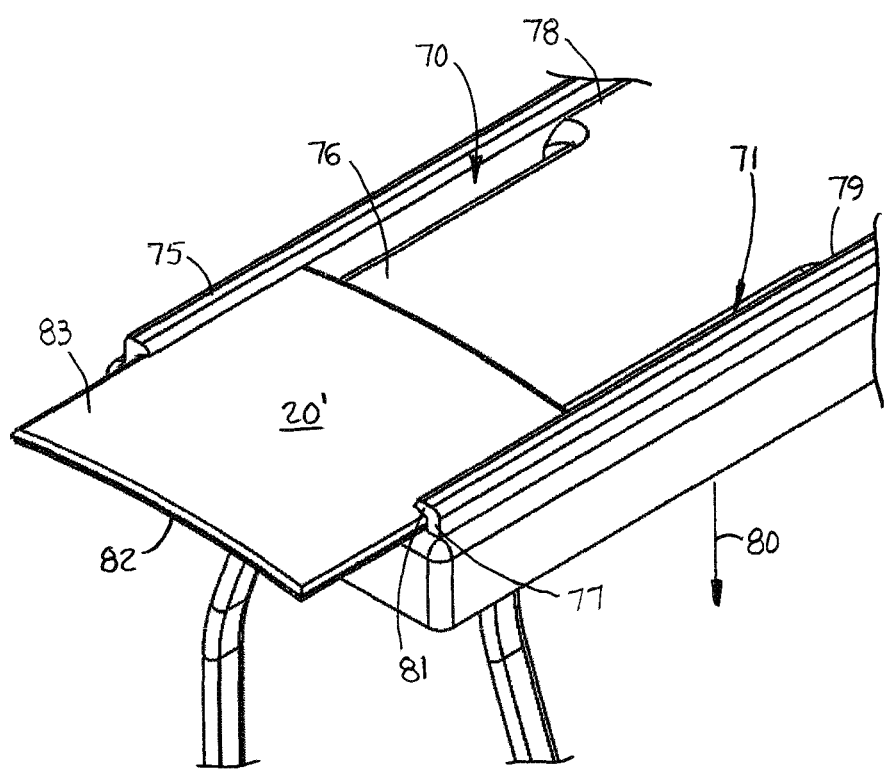
FIG. 11 is an end view of a tray conveyor as in FIG. 4, but with a crowned stator housing and a concave tray bottom.

FIGS. 10A-10C depict the operation of the disposal system. A tray 20 removes debris 74 from the conveyor 40 by sweeping it into a through hole 59. In FIG. 10A the tray 20 is shown advancing in the conveying direction 50 toward the debris 74. In FIG. 10B the tray 20 is shown pushing the debris 74 along the conveyor's top guide surface 56 into the elongated slot 59. In FIG. 10C the debris 74 is shown falling from the slot as the tray 20 passes by. The tray 20 also sweeps fluids that build up on the top guide surface 56 into the through holes 58, 59 to drain. To further assist with the drainage of fluids, especially with side gutters 70, 71 as in FIG. 8, the top guide surface 56 can be crowned as in FIG. 11. The crowned top guide surface 76 drains toward the sides 78, 79 and exits through the through holes 70, 71 indicated by the arrow 80. The bottom 82 of the tray 20' has a concave contour to complement the convex shape of the crowned guide surface 76. The top 83 of the tray 20' can be convex, as shown, flat, or contoured. If the top 83 is curved across its entire width, the angle between the overhang 81 and the wall 77 of the tray rails 75 would have to be slightly greater than 90° to accommodate the curve.

Figure 12:
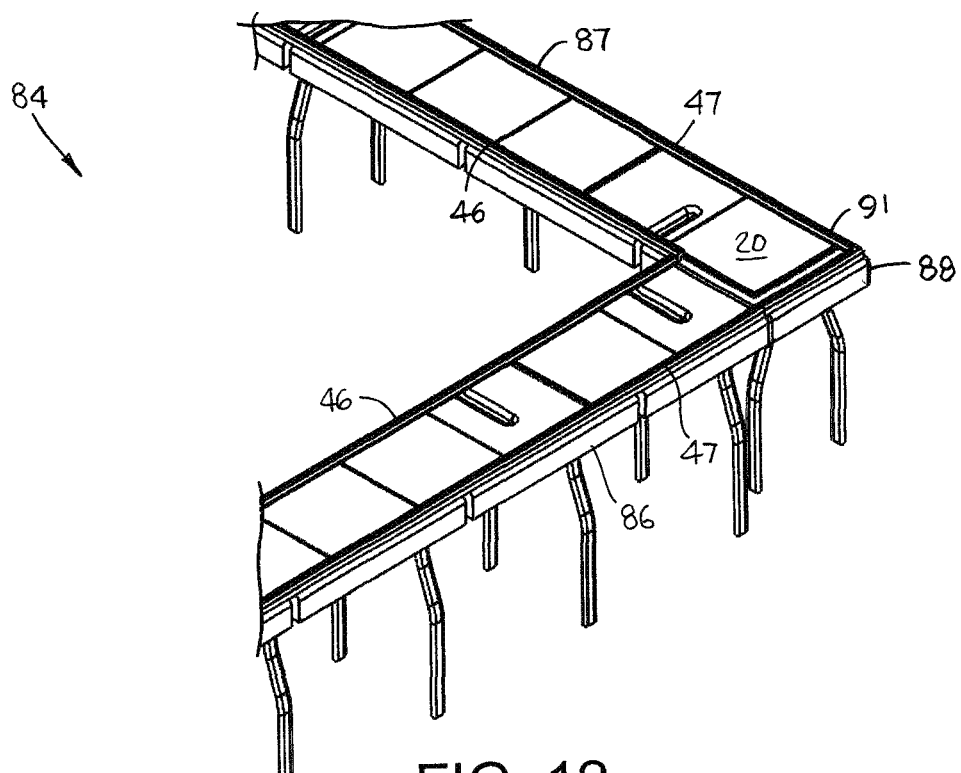
FIG. 12 is an isometric view of a portion of a tray conveyor as in FIG. 4 with a corner section.
Figure 13:
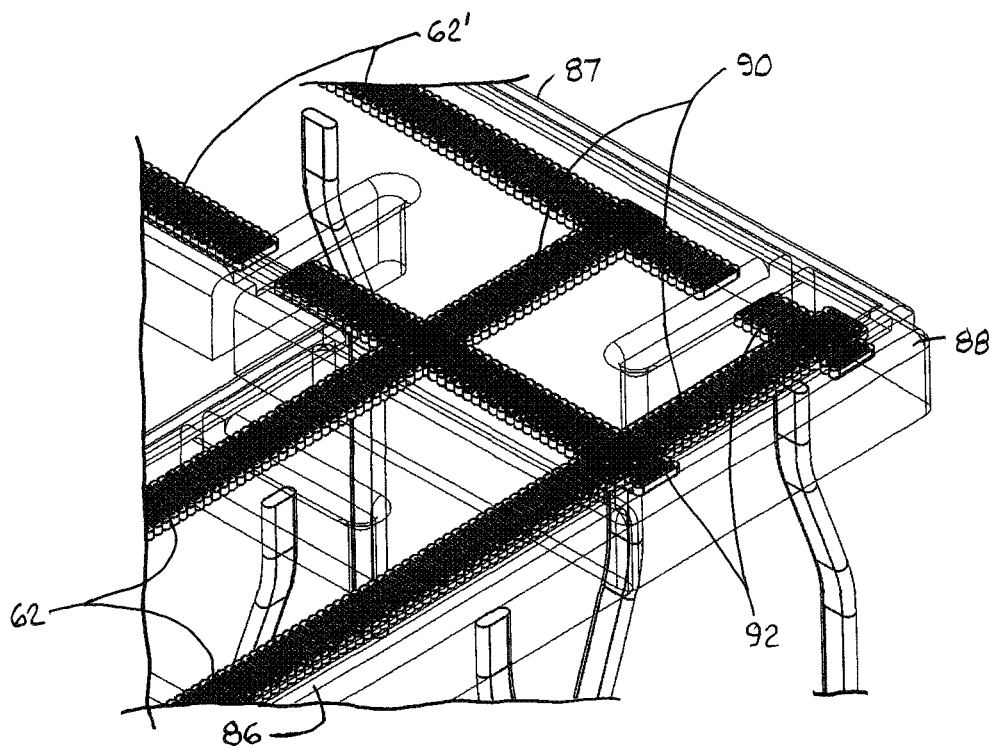
FIG. 13 is an enlarged view of the corner section of FIG. 12 with the stator housing in phantom.

One corner of a tray conveyor 84 with a 90° turn is shown in FIGS. 12 and 13. The conveyor includes a first conveyor section 86 and a second conveyor section 87 perpendicular to the first conveyor section. In this example the left tray rails 46 of the two sections 86, 87 abut at adjacent ends and so are continuous. A junction section, in particular, a corner section 88, joins the first section 86 to the second section 87. The corner section 88 has an outside tray rail 91 composed of two right-angle segments that align with the right tray rails 47 of the two sections 86, 87. The corner section 88 serves as an x-y translator with a first stator 90 having coils in series and aligned with the coils of the stator 62 in the first section 86 and a second stator 92 having coils in series and aligned with the coils of the stator 62' in the second section 87. The first and second stators are perpendicular to each other for the 90° turn. When the tray 20 enters the corner section 88 from the first conveyor section 86, its first magnet array 36 (FIG. 3) is vertically aligned with the first stator coils 90. When the tray 20 is fully on the corner section 88, the first stator 90 is de-energized to halt the motion of the tray. In that position the second magnet array 37 (FIG. 3) of the tray 20 is vertically aligned with the second stator coils 92, which are energized to translate the tray onto the second conveyor section 87. (A corner section is just one kind of junction section, in which the direction of travel of a tray can be changed. Other versions include junction sections at a three-way intersection or a T-junction and junction sections at four-way intersections.

Figure 21:
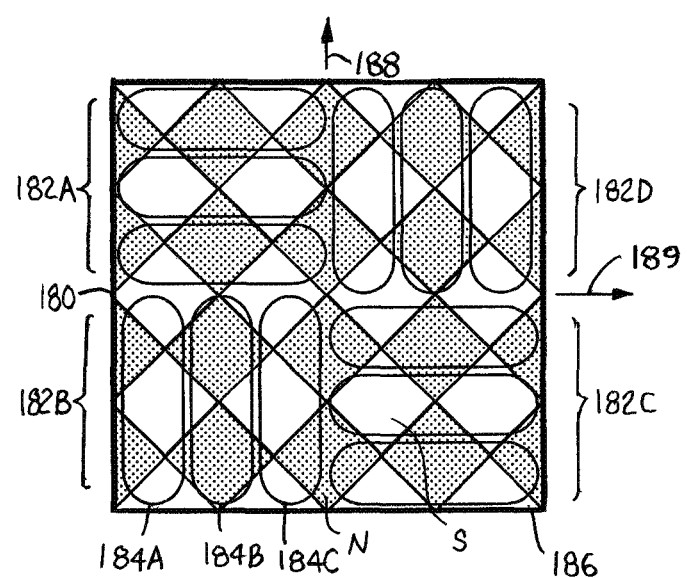
FIG. 21 is a transparent plan view of a magnetic tray with a checkerboard array of magnets over a corner section of a tray conveyor.

Another version of a corner section used with a checkerboard array of tray magnets N, S is depicted in FIG. 21. The corner section 180 is shown with four sets 182A-182D of three-phase coils 184A-184C. First diagonally opposite sets 182A, 182C are arranged perpendicular to second diagonally opposite sets 182B, 182D. The first sets 182A, 182C propagate electromagnetic flux waves that interact with the obliquely oriented checkerboard array of magnets N, S in the tray 186 to drive the tray in a first direction 188. The second sets 182B, 182D propagate electromagnetic flux waves that interact with the checkerboard array to drive the tray 186 in a second direction 189 perpendicular to the first direction 188. Each three-coil set 182A-182D extends over two tray-magnet periods 190. The coils 184A-184C can also be operated to levitate the tray 186.

Figure 14A:
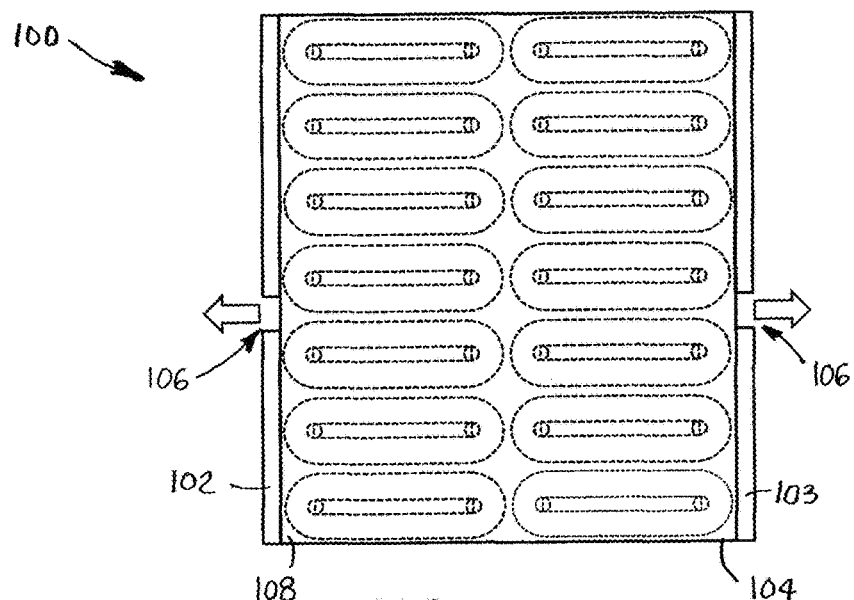
FIGS. 14A and 14B are top plan and front elevation views of a portion of a tray conveyor as in FIG. 4 with gaps in the tray rails.
Figure 14B:
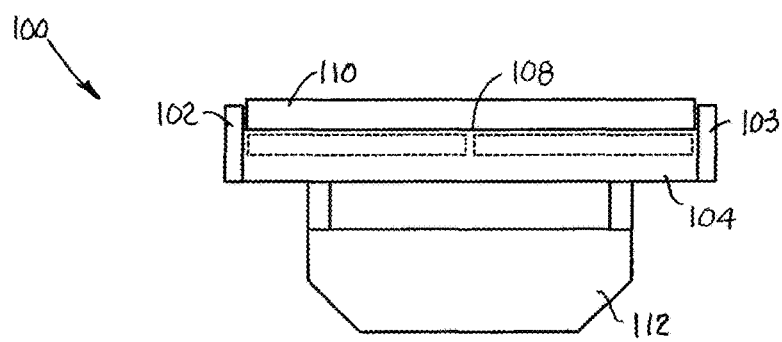
Figure 15:
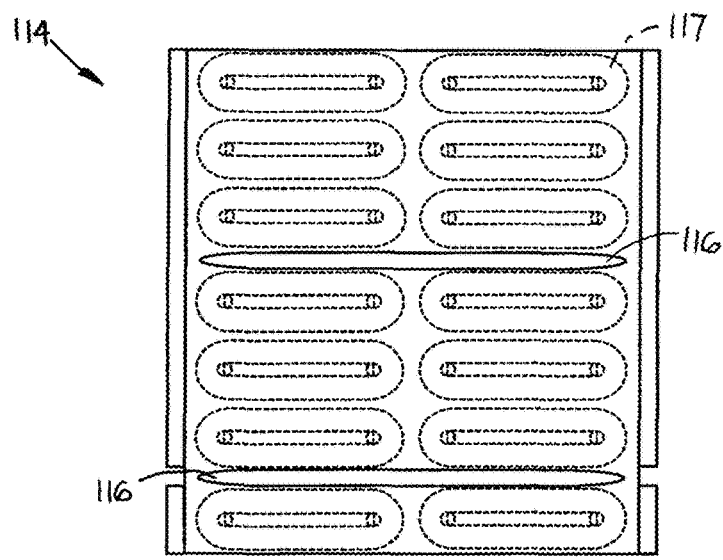
FIG. 15 is a top plan view of a tray conveyor as in FIG. 14A with through holes for disposal of debris.

Another version of a disposal system in a tray conveyor is shown in FIGS. 14A and 14B. The tray conveyor 100 has tray rails 102, 103 abutting a stator enclosure 104 along each side. Gaps 106 at spaced apart locations along the length of the tray conveyor 100 form the disposal system by providing for the escape of fluids that collect on a top guide surface 108 of the stator enclosure 104. A tray 110 helps push fluids through the gaps 106. The tray conveyor 100 is supported in a conveyor frame 112. The tray conveyor 114 in FIG. 15 uses laterally elongated through holes 116 spaced apart along the length of the conveyor in its disposal system. The shape of the through holes 116 through the top guide surface 108 and the stator enclosure 104 is designed to minimize the area of the top guide surface not directly above the stator coils 117.

Figure 16A:
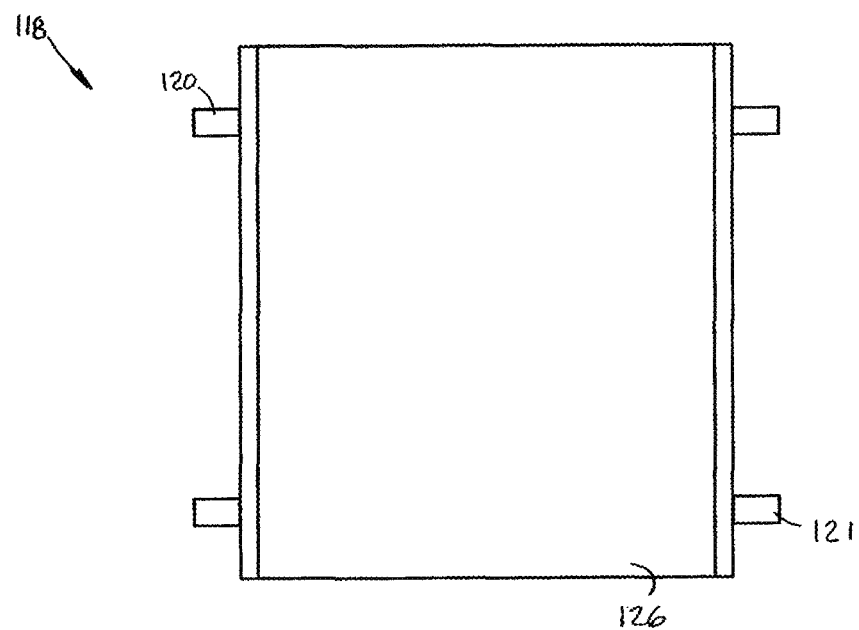
FIGS. 16A and 16B are top plan and front elevation views of a portion of another version of a tray conveyor having disposal gaps below the tray rails.
Figure 16B:
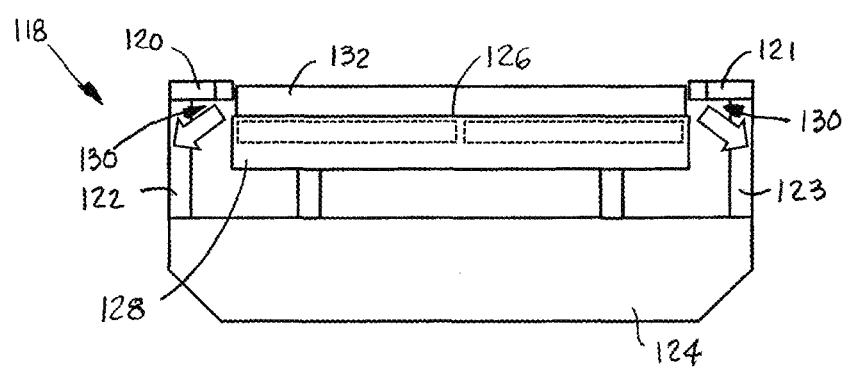
Figure 17:
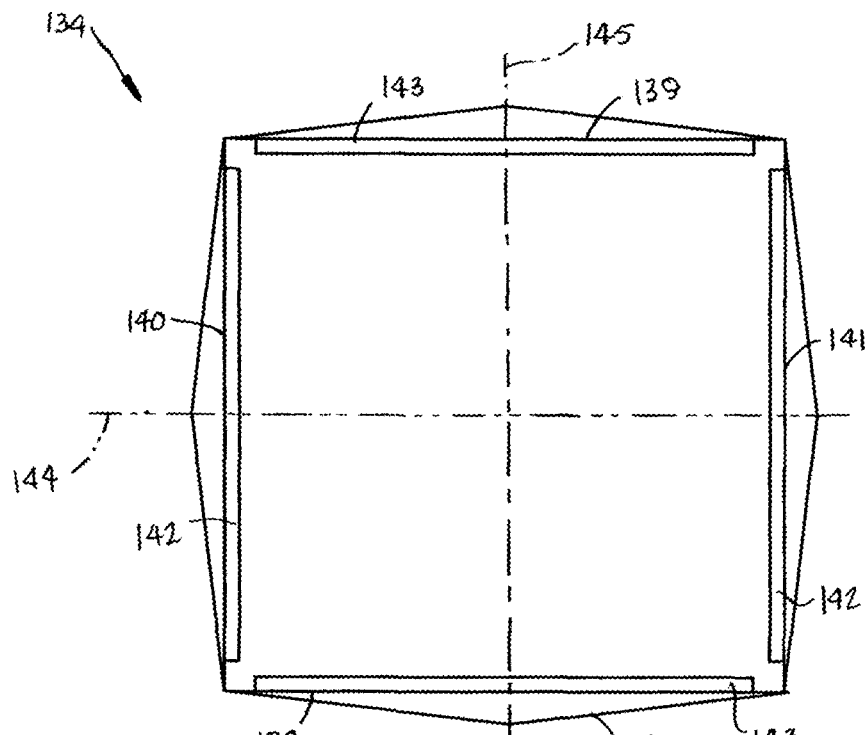
FIG. 17 is a top plan view of another version of a tray embodying features of the invention including V-shaped sides and ends and top walls.
Figure 18:
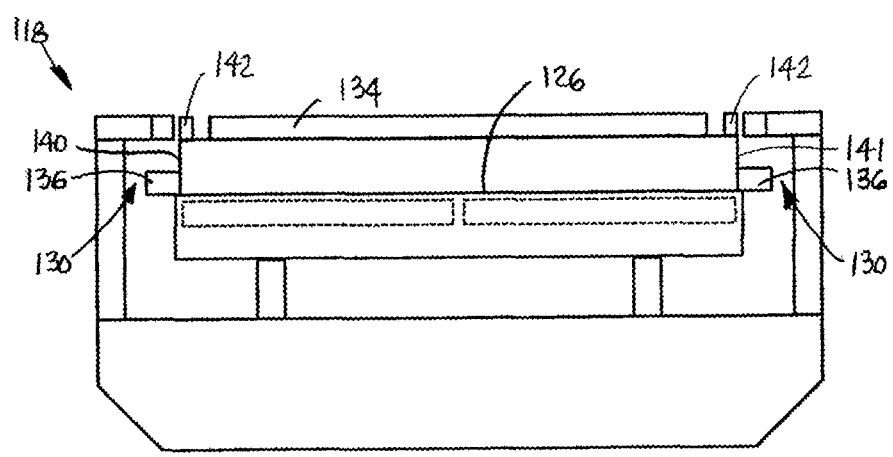
FIG. 18 is a front elevation view of a portion of a tray conveyor as in FIG. 16A adapted for a tray as in FIG. 17.

In the tray conveyor 118 of FIGS. 16A and 16B, tray rails 120, 121 are supported on vertical supports 122, 123 in a conveyor frame 124. The tray rails 120, 121 are positioned above the level of a top guide surface 126 and a stator enclosure 128. Gaps 130 below the tray rails 120, 121 form a disposal system through which fluids and debris are pushed by trays 132. The tray conveyor 118 of FIGS. 16A and 16B is shown in FIG. 18 with a tray 134 as in FIG. 17 having a skewed or V-shaped skirt 136 on its front and rear ends 138, 139 and its left and right sides 140, 141. The skirts 136 on the sides 140, 141 gather and push debris into the gaps 130 as the tray 134 rides along the top guide surface 126. Side walls 142 extending up from the top of the tray 134 along the left and right sides 140, 141 cooperate with the tray rails 120, 121 to limit the lateral drift of the tray. Together with end walls 143 on the front and rear ends 138, 139, the side walls confine articles on the tray 134. The tray 134 can be used with other of the tray conveyors described. In this version the tray 134 is square—symmetrical about lateral and longitudinal axes 144, 145—so that front, rear, left, and right are interchangeable. But the tray could be non-square—rectangular, for example—for use with wide conveyor sections that extend in length in a first direction joined by rectangular junction sections to narrow conveyor sections that extend in length perpendicular to the first direction.

Figure 19A:
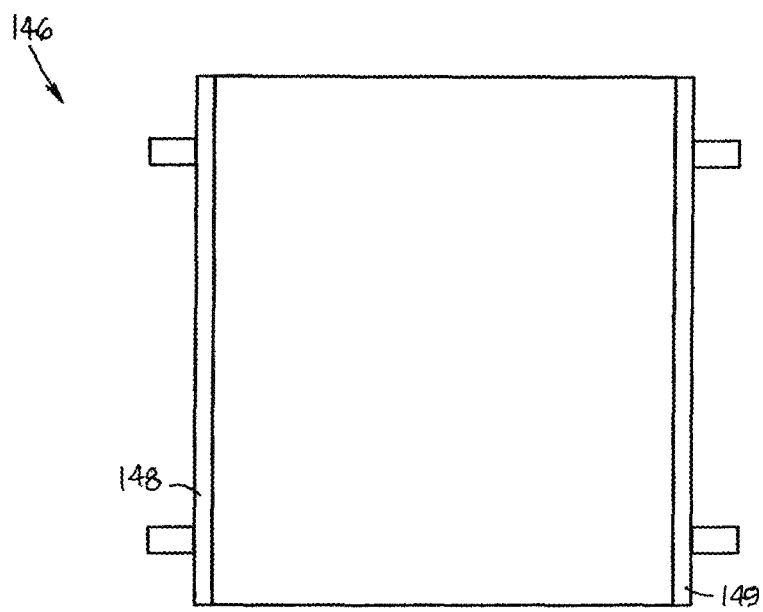
FIGS. 19A and 19B are top plan and front elevation views of a portion of another version of a tray conveyor having spring-loaded tray rails.
Figure 19B:
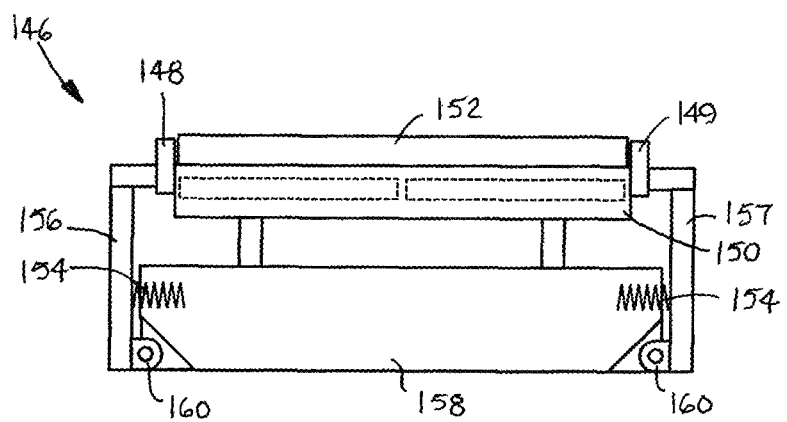

Another version of a tray conveyor is shown in FIGS. 19A and 19B. The tray conveyor 146 is similar to that of FIGS. 16A and 16B, except that tray rails 148, 149 abut the sides of the stator enclosure 150 and limit the lateral drift of the tray 152. And the tray rails 148, 149 are biased inward toward the enclosure 150 and the tray 152 by springs 154 connected between tray-guide supports 156, 157 and the conveyor frame 158. The spring bias is light enough that debris between the side of the tray 152 and the tray rails 148, 149 forces the supports 156, 157 to pivot outward on hinges 160 to open gaps between the tray rails 148, 149 and the sides of the stator enclosure 150 through which debris and fluids can be disposed.

Figure 20A:
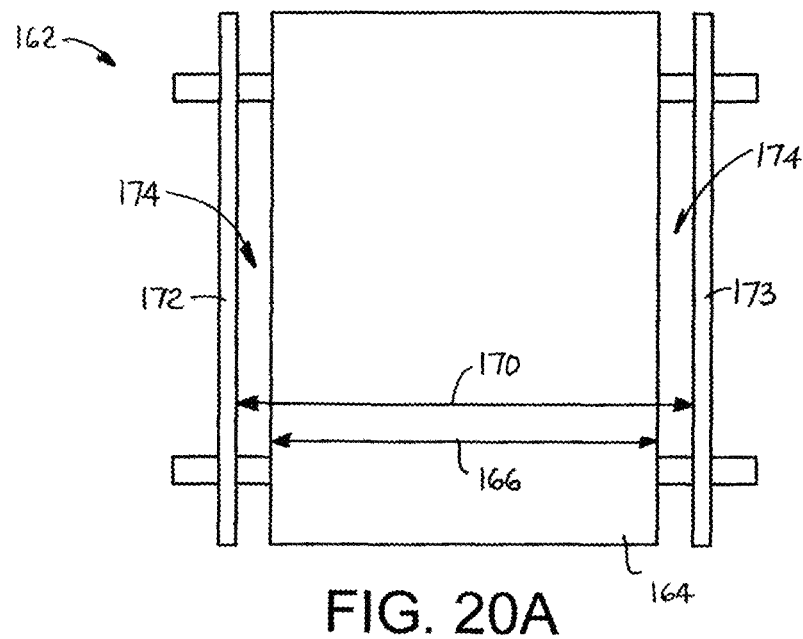
FIGS. 20A and 20B are top plan and front elevation views of a portion of another version of a tray conveyor having a top guide surface narrower than the trays.
Figure 20B:
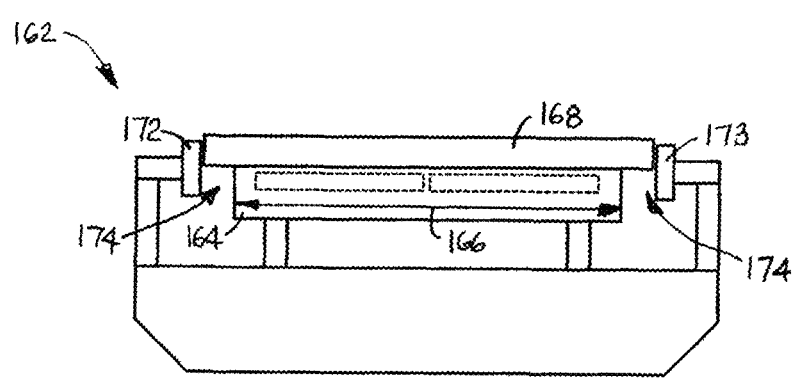

Yet another example of a tray conveyor with a disposal system is shown in FIGS. 20A and 20B. In this version a tray conveyor 162 supports a stator enclosure 164 whose lateral width 166 is less than the width of the tray 168 and the distance 170 between left and right tray rails 172, 173.

Longitudinal gaps 174 along each side of the tray conveyor 162 provide an escape route for fluids and debris.

Figure 22:
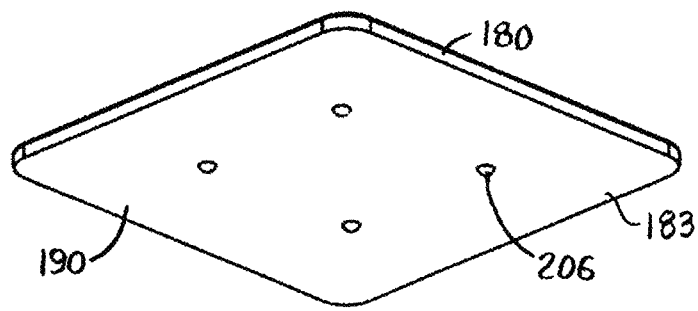
FIG. 22 is an isometric view from the bottom of a conveyor tray embodying features of the invention including bottom roller balls.
Figure 23:
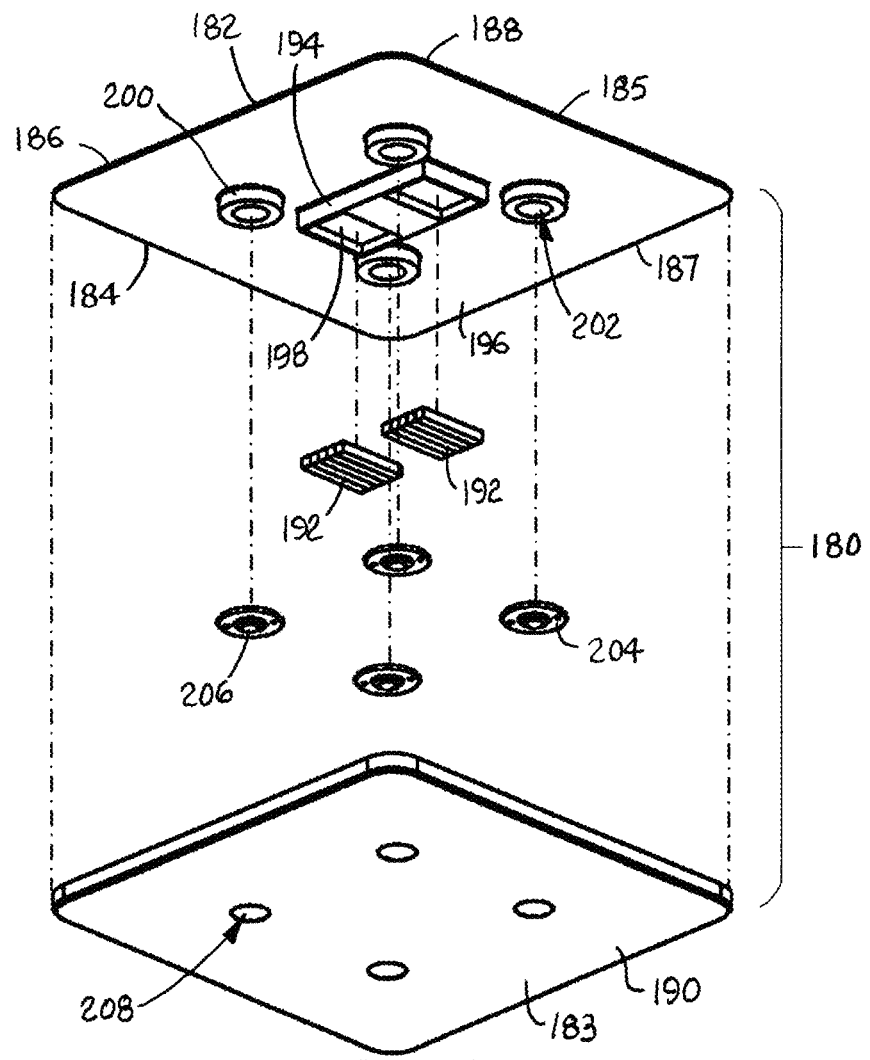
FIG. 23 is an exploded view of the conveyor tray of FIG. 22.

Another version of a magnetic conveyor tray for a tray conveyor is shown in FIGS. 22 and 23. The tray 180 is a low-profile, four-sided disk, or plate, with an upper article-supporting face 182 and a bottom face 183. The tray 180 extends in length from a first end 184 to a second end 185 and in width from a first side 186 to a second side 187. The length and width of the low-profile tray 180 are much greater than the tray's thickness from the top face 182 to the bottom face 183.

The tray 180 is constructed of a top 188 and an opposite bottom 190. Permanent magnet arrays 192, such as Halbach arrays, disposed between the top 188 and the bottom 190, form a forcer of a linear motor. The top 188 has a raised platform 194 that extends from the top's underside 196. Receptacles 198 in the raised platform 194 receive the magnet arrays 192 in line with each other. Bosses 200 on the top's underside 196 have circular cavities 202 sized to receive the cups (not shown) of ball assemblies 204. The bosses 200 and the magnet platform 194 extend from the top 188 the same distance to serve as spacers between the top and the bottom 190. When the top 188 and the bottom 190 are joined, salient portions of the balls 206 extend past the bottom through holes 208. The four roller balls 206 are positioned to define the corners of a rectangle, such as a square. But they could be arranged in a different configuration. The magnets 192 and the roller-ball assemblies 204 are sandwiched between the top 188 and bottom 190. Like the magnetic conveyor tray 20 of FIGS. 1 and 2, the conveyor tray 180 can be made with a top 188 and a bottom 190 made of the same or different materials. And the top 188 and the bottom 190, which are shown as separate pieces in FIG. 23, can be attached by the same methods as for the tray 20 of FIGS. 1 and 2. But the top and the bottom could be molded over the magnet arrays and the roller-ball assemblies to form a monolithic one-piece, rather than a two-piece, tray.

Figure 24:
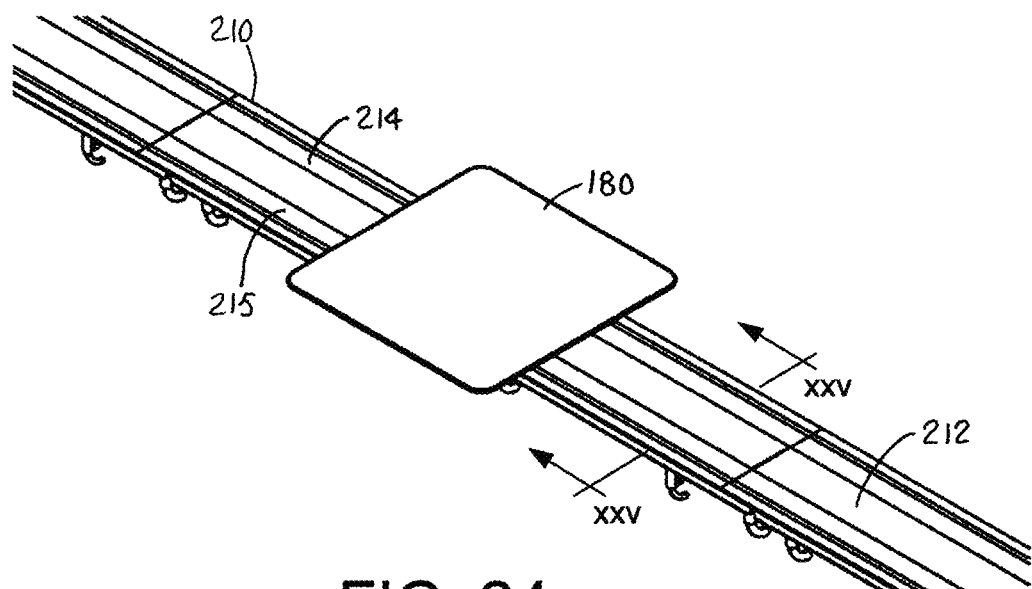
FIG. 24 is an isometric view of a portion of a magnetic tray conveyor with the tray of FIG. 22.
Figure 25:
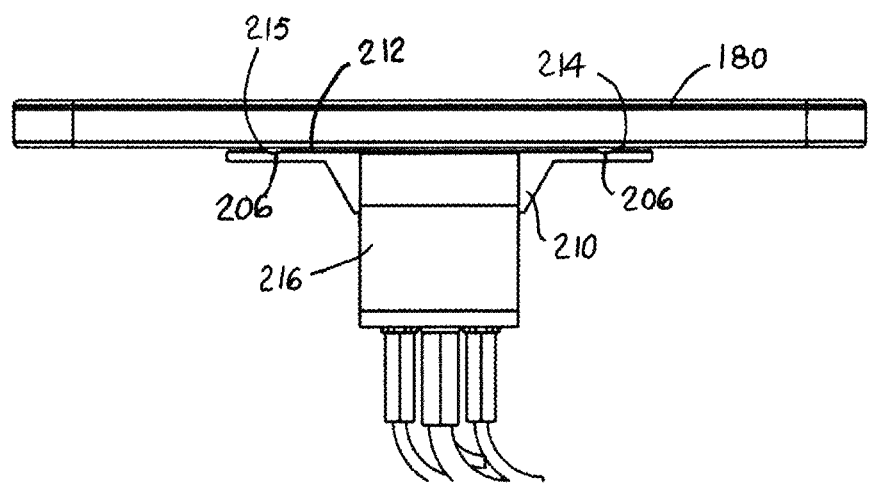
FIG. 25 is an enlarged cross-section of the magnetic tray conveyor viewed along lines XXV of FIG. 24.

The magnet tray 180 is shown on a tray conveyor 210 in FIGS. 24 and 25. The tray conveyor 210 has a top guide surface 212 with two parallel grooves 214, 215 extending along its length. The grooves 214, 215 are spaced from each other and shaped to receive the roller balls 206 on each side of the tray 180. The grooves 214, 215 confine the roller balls 206 and keep the tray 180 on track. The roller balls 206 replace the sliding friction with a much lower rolling friction.

The tray conveyor 210 has enclosures 216 that each house a series of stator coils (not shown) that extend the length of the conveyor. The electromagnetic fields generated by the coils interact with the magnetic fields of the magnet arrays to propel the tray 180 along the carryway. The magnet-array forcer in the tray 180 forms a linear motor with the stator drive coils. The enclosures could also include ferrous materials attracted by the magnet arrays in the trays 180 to further hold the tray on the carryway. But the attraction would not be so strong as to prevent a tray from being manually lifted from the track.

Thus, the magnetic roller tray 180 provides a low-friction, hygienic mover with an integral article-conveying surface without the need for external attachments.

What is claimed is:

1. A conveyor tray comprising:
    a top including an upper article-conveying face;
    a bottom opposite the top;
    a forcer sandwiched between the top and the bottom;
    a plurality of roller balls protruding through the bottom.

2. A conveyor tray as in claim 1 comprising four roller balls defining the corners of a rectangle.

3. A conveyor tray as in claim 1 wherein the top and the bottom are separate pieces.

4. A conveyor tray as in claim 3 wherein the top is made of a first material and the bottom is made of a different second material.

5. A conveyor tray as in claim 4 wherein the first material is a hygienic material such as polyethylene terephthalate (PET, or PETE), high-density polyethylene (HDPE), or polystyrene (PS).

6. A conveyor tray as in claim 4 wherein the second material is a low-friction material such as polyoxymethylene (POM, acetal), polypropylene (PP), or ultra-high-molecular-weight polyethylene (UHMW).

7. A conveyor tray as in claim 1 wherein the forcer includes two permanent-magnet arrays in line with each other.

8. A conveyor tray as in claim 1 comprising roller assemblies with flanges, wherein the roller assemblies each retain one of the roller balls.

9. A conveyor tray as in claim 8 wherein the flanges are sandwiched between the top and the bottom and wherein the bottom has holes through which salient portions of the roller balls protrude.

10. A tray conveyor comprising:
    a tray including:
        a top;
        a bottom attached to the top and having holes therethrough;
        a forcer disposed between the top and the bottom;
        a plurality of roller balls having salient portions extending through the holes in the bottom;
    a conveyor frame;
    a linear-motor stator supported in the conveyor frame;
    a stator enclosure housing the linear-motor stator supported in the conveyor frame;
    a top guide surface supported in the conveyor frame under the tray, and having a pair of parallel grooves extending along the length of the top guide surface and sized to receive the roller balls of the tray to retain the roller balls as the linear-motor stator propagates an electromagnetic wave along the length of the conveyor frame that interacts with the forcer to propel the tray along the top guide surface with the roller balls rolling in the grooves.

11. A tray conveyor as in claim 10 wherein the forcer includes one or more permanent-magnet arrays.

12. A tray conveyor as in claim 11 wherein the conveyor frame includes ferrous material attracted by the permanent-magnet arrays to help hold the tray to the top guide surface.

13. A tray conveyor as in claim 10 wherein the top is made from a first material and the bottom is made from a second material.

* * * * *